(12) United States Patent
Levi et al.

(10) Patent No.: US 12,289,388 B2
(45) Date of Patent: Apr. 29, 2025

(54) SYNTONIZATION THROUGH PHYSICAL LAYER OF INTERCONNECTS

(71) Applicant: MELLANOX TECHNOLOGIES, LTD., Yokneam (IL)

(72) Inventors: Dotan David Levi, Kiryat Motzkin (IL); Wojciech Wasko, Mlynek (PL); Natan Manevich, Ramat Hasharon (IL)

(73) Assignee: Mellanox Technologies, Ltd, Yokneam (IL)

( * ) Notice: Subject to any disclaimer, the term of this patent is extended or adjusted under 35 U.S.C. 154(b) by 473 days.

(21) Appl. No.: 17/868,841

(22) Filed: Jul. 20, 2022

(65) Prior Publication Data

US 2024/0031124 A1 Jan. 25, 2024

(51) Int. Cl.
*H04L 7/027* (2006.01)
*H04L 12/40* (2006.01)

(52) U.S. Cl.
CPC .............. *H04L 7/027* (2013.01); *H04L 12/40* (2013.01)

(58) Field of Classification Search
CPC ................. H04L 7/027; H04L 12/40
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,636 B1 | 4/2003 | Takagi |

(Continued)

FOREIGN PATENT DOCUMENTS

| | | |
|---|---|---|
| CN | 106817183 A | 6/2017 |
| CN | 108829493 A | 11/2018 |

(Continued)

OTHER PUBLICATIONS

U.S. Appl. No. 17/579,630 Office Action dated Oct. 24, 2022.

(Continued)

*Primary Examiner* — Duc C Ho
(74) *Attorney, Agent, or Firm* — Meitar Patents Ltd.; Daniel Kligler

(57) ABSTRACT

In one embodiment, a clock syntonization system includes a first compute node including a first physical hardware clock to operate at a first clock frequency, a second compute node, and an interconnect data bus to transfer data from the first compute node at a data rate indicative of the first clock frequency of the first physical hardware clock, and wherein the second compute node includes clock synchronization circuitry to derive a second clock frequency from the data rate of the transferred data, and provide a clock signal at the derived second clock frequency.

28 Claims, 3 Drawing Sheets

(56) References Cited

U.S. PATENT DOCUMENTS

| | | |
|---|---|---|
| 6,556,638 B1 | 4/2003 | Blackburn |
| 6,718,476 B1 | 4/2004 | Shima |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,300,749 B2 | 10/2012 | Hadzic et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng |
| 8,930,647 B1 | 1/2015 | Smith |
| 9,344,265 B2 | 5/2016 | Karnes |
| 9,397,960 B2 | 7/2016 | Arad et al. |
| 9,549,234 B1 | 1/2017 | Mascitto |
| 9,753,854 B1 | 9/2017 | Bao |
| 9,942,025 B2 | 4/2018 | Bosch et al. |
| 9,979,998 B1 | 5/2018 | Pogue et al. |
| 10,014,937 B1 | 7/2018 | Di Mola et al. |
| 10,027,601 B2 | 7/2018 | Narkis et al. |
| 10,054,977 B2 | 8/2018 | Mikhaylov et al. |
| 10,095,543 B1 | 10/2018 | Griffin et al. |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,623,173 B1 * | 4/2020 | Geng ................. H03L 7/087 |
| 10,637,776 B2 | 4/2020 | Iwasaki |
| 10,727,966 B1 | 7/2020 | Izenberg et al. |
| 10,778,361 B1 | 9/2020 | Almog et al. |
| 10,841,243 B2 | 11/2020 | Levi et al. |
| 10,879,910 B1 | 12/2020 | Franck et al. |
| 10,887,077 B1 | 1/2021 | Ivry |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 2001/0006500 A1 | 7/2001 | Nakajima et al. |
| 2002/0027886 A1 | 3/2002 | Fischer et al. |
| 2002/0031199 A1 | 3/2002 | Rolston et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0139085 A1 | 6/2007 | Elliot et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0055676 A1 | 2/2009 | Wiebe |
| 2009/0257458 A1 | 10/2009 | Cui et al. |
| 2010/0280858 A1 | 11/2010 | Bugenhagen |
| 2011/0182191 A1 | 7/2011 | Jackson |
| 2011/0194425 A1 | 8/2011 | Li et al. |
| 2012/0063556 A1 | 3/2012 | Hoang |
| 2012/0076319 A1 | 3/2012 | Terwal |
| 2012/0301134 A1 | 11/2012 | Davari et al. |
| 2013/0039359 A1 | 2/2013 | Bedrosian |
| 2013/0045014 A1 | 2/2013 | Mottahedin et al. |
| 2013/0215889 A1 | 8/2013 | Zheng et al. |
| 2013/0235889 A1 | 9/2013 | Aweya et al. |
| 2013/0294144 A1 | 11/2013 | Wang et al. |
| 2013/0315265 A1 | 11/2013 | Webb, III et al. |
| 2013/0336435 A1 | 12/2013 | Akkihal et al. |
| 2014/0085141 A1 | 3/2014 | Geva et al. |
| 2014/0153680 A1 | 6/2014 | Garg et al. |
| 2014/0185216 A1 | 7/2014 | Zeng et al. |
| 2014/0185632 A1 | 7/2014 | Steiner et al. |
| 2014/0253387 A1 | 9/2014 | Gunn et al. |
| 2014/0281036 A1 | 9/2014 | Cutler et al. |
| 2014/0301221 A1 | 10/2014 | Nadeau et al. |
| 2014/0321285 A1 | 10/2014 | Chew et al. |
| 2015/0019839 A1 | 1/2015 | Cardinell et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0163050 A1 | 6/2015 | Han et al. |
| 2015/0318941 A1 | 11/2015 | Zheng et al. |
| 2016/0057518 A1 | 2/2016 | Neudorf |
| 2016/0072602 A1 | 3/2016 | Earl et al. |
| 2016/0078901 A1 | 3/2016 | Toma et al. |
| 2016/0110211 A1 | 4/2016 | Karnes |
| 2016/0140066 A1 | 5/2016 | Worrell et al. |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky |
| 2017/0017604 A1 | 1/2017 | Chen et al. |
| 2017/0126589 A1 | 5/2017 | Estabrooks et al. |
| 2017/0160933 A1 | 6/2017 | De Jong et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0188698 A1 | 7/2018 | Dionne et al. |
| 2018/0191802 A1 | 7/2018 | Yang et al. |
| 2018/0227067 A1 | 8/2018 | Hu et al. |
| 2018/0309654 A1 | 10/2018 | Achkir et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2020/0403652 A1 | 12/2020 | Goff et al. |
| 2021/0006344 A1 | 1/2021 | Chen et al. |
| 2021/0141413 A1 | 5/2021 | Levi et al. |

(56) References Cited

U.S. PATENT DOCUMENTS

| | | |
|---|---|---|
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Arnon Sattinger et al. |
| 2021/0392065 A1 | 12/2021 | Sela et al. |
| 2021/0409031 A1 | 12/2021 | Ranganathan et al. |
| 2022/0006606 A1 | 1/2022 | Levi et al. |
| 2022/0021393 A1 | 1/2022 | Ravid et al. |
| 2022/0066978 A1 | 3/2022 | Mishra et al. |
| 2022/0086105 A1 | 3/2022 | Levi et al. |
| 2022/0173741 A1 | 6/2022 | Ravid et al. |
| 2022/0191275 A1 | 6/2022 | Levi et al. |
| 2022/0191578 A1 | 6/2022 | Ramkumar et al. |
| 2022/0121691 A1 | 7/2022 | Mentovich et al. |
| 2022/0224500 A1 | 7/2022 | Mula et al. |
| 2022/0239549 A1 | 7/2022 | Zhao et al. |
| 2022/0342086 A1 | 10/2022 | Yoshida |
| 2022/0390979 A1 | 12/2022 | Xu |
| 2024/0204897 A1* | 6/2024 | Manevich ............ H04J 3/0667 |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| TW | 498259 B | 8/2002 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

U.S. Appl. No. 17/579,630 Office Action dated Jan. 12, 2023.
U.S. Appl. No. 17/670,540 Office Action dated Jan. 18, 2023.
U.S. Appl. No. 17/191,736 Office Action dated Nov. 10, 2022.
Levi et al., U.S. Appl. No. 17/582,058, filed Jan. 24, 2022.
Levi et al., U.S. Appl. No. 17/246,730, filed May 3, 2021.
Levi et al., U.S. Appl. No. 17/315,396, filed May 10, 2021.
Levi et al., U.S. Appl. No. 17/359,667, filed Jun. 28, 2021.
Wasko et al., U.S. Appl. No. 17/520,674, filed Nov. 7, 2021.
Wasko et al., U.S. Appl. No. 17/582,058, filed Jan. 24, 2022.
Levi et al., U.S. Appl. No. 17/667,600, filed Feb. 9, 2022.
Shapira et al., U.S. Appl. No. 17/534,776, filed Nov. 24, 2021.
Shapira et al., U.S. Appl. No. 17/578,115, filed Jan. 18, 2022.
Kernen et al., U.S. Appl. No. 17/858,236, filed Jul. 6, 2022.
Zhang et al., "TI BAW technology enables ultra-low jitter clocks for highspeed networks", White paper, Texas Instruments, pp. 1-11, Feb. 2019.
Skywork Solutions Inc., "PCI Express 3.1 JITTER Requirements", AN562, pp. 1-16, year 2021.
Intel, "Can Altera GX/GT/GZ device high speed transceivers handle Spread Spectrum Clocking (SSC), as required by PCIe or SATA/ SAS protocols?", p. 1, Sep. 11, 2012.
Pismenny et al., U.S. Appl. No. 17/824,954, filed May 26, 2022.
U.S. Appl. No. 17/867,779 Office Action dated Mar. 28, 2024.
U.S. Appl. No. 17/871,937 Office Action dated Aug. 1, 2023.
U.S. Appl. No. 17/578,115 Office Action dated Apr. 26, 2023.
U.S. Appl. No. 17/534,776 Office Action dated Jun. 29, 2023.
SiTime Corporation, "Sit5377—60 to 220 MHZ, ±100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands-3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Wasko et al., U.S. Appl. No. 17/549,949, filed Dec. 14, 2021.
Ipclock, "IEEE 1588 Primer," ip-clock.com, pp. 1-3, May 1, 2017 (downloaded from https://web.archive.org/web/20170501192647/http://ip-clock.com/ieee-1588-primer/).
ITU-T Standard G.8261/Y.1361, "Timing and synchronization aspects in packet networks", pp. 1-120, Aug. 2019.
Levy et al., U.S. Appl. No. 17/313,026, filed May 6, 2021.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
ITU-T Standard G.8262/Y.1362, "Timing characteristics of synchronous equipment slave clock", pp. 1-44, Nov. 2018.
ITU-T Standard G.8264/Y.1364, "Distribution of timing information through packet networks", pp. 1-42, Aug. 2017.
Manevich et al., U.S. Appl. No. 17/579,630, filed Jan. 20, 2022.
Levi et al., U.S. Appl. No. 17/871,937, filed Jul. 24, 2022.
Manevich et al., U.S. Appl. No. 17/867,779, filed Jul. 19, 2022.
Manevich et al., U.S. Appl. No. 17/885,604, filed Aug. 11, 2022.
U.S. Appl. No. 17/191,736 Advisory Action dated Feb. 16, 2023.
"IEEE Standard for Local and Metropolitan Area Networks—Timing and Synchronization for Time-Sensitive Applications," IEEE Std 802.1AS-2020, IEEE Computer Society, pp. 1-421, year 2020.
U.S. Appl. No. 17/549,949 Office Action dated Mar. 30, 2023.
Corbett et al., "Spanner: Google's Globally Distributed Database," ACM Transactions on Computer Systems, vol. 31, No. 3, article 8, pp. 1-22, Aug. 2013.
U.S. Appl. No. 17/191,736 Office Action dated Jun. 26, 2023.
U.S. Appl. No. 17/885,604 Office Action dated Nov. 13, 2024.
U.S. Appl. No. 17/867,779 Office Action dated Jan. 30, 2025.

* cited by examiner

SYNTONIZATION THROUGH PHYSICAL LAYER OF INTERCONNECTS

FIELD OF THE INVENTION

The present invention relates to computer systems, and in particular, but not exclusively to, syntonization of computer devices.

BACKGROUND

Clock synchronization among network devices is used in many network applications. One application of using a synchronized clock value is for measuring one-way latency from one device to another device. If the clocks are not synchronized the resulting one-way latency measurement will be inaccurate.

Synchronization is typically achieved by syntonization, in which the clock frequency of two devices is aligned, and aligning offset and phase between the two devices.

For Ethernet, there are two complementary methods to achieve synchronization. One is Synchronous Ethernet (SyncE), which is a physical-layer protocol which achieves syntonization based on the receive/transmit symbol rate. SyncE is an International Telecommunication Union Telecommunication (ITU-T) Standardization Sector standard for computer networking that facilitates the transference of clock signals over the Ethernet physical layer. In particular, SyncE enables clock syntonization inside a network with respect to a master clock.

The other is Precision Time Protocol (PTP), which is a packet-based protocol that may be used with SyncE to align offset (e.g., in Coordinated Universal Time (UTC) format) and phase between two clocks. It should be noted that PTP may be used alone over Ethernet (without SyncE), but this is typically used for lower accuracy use cases. PTP is used to synchronize clocks throughout a computer network, and is considered to be the de-facto standard for this purpose.

Time, clock and frequency synchronization is crucial in some modern computer network applications. It enables 5G and 6G networks, and is proven to enhance the performance of data center workloads.

SUMMARY

There is provided in accordance with an embodiment of the present disclosure, a clock syntonization system, including a first compute node including a first physical hardware clock to operate at a first clock frequency, a second compute node, and an interconnect data bus to transfer data from the first compute node at a data rate indicative of the first clock frequency of the first physical hardware clock, and wherein the second compute node includes clock synchronization circuitry to derive a second clock frequency from the data rate of the transferred data, and provide a clock signal at the derived second clock frequency.

Further in accordance with an embodiment of the present disclosure the first compute and second compute node may include any one or more of the following a central processing unit, a graphics processing unit, a network interface controller, a switch, a bridge, and a data processing unit.

Still further in accordance with an embodiment of the present disclosure the interconnect data bus is a peripheral device interconnect data bus.

Additionally in accordance with an embodiment of the present disclosure the data is transferred over the interconnect data bus in at least one digital signal.

Moreover, in accordance with an embodiment of the present disclosure the second compute node includes a second physical hardware clock to operate at a third clock frequency, the clock synchronization circuitry being configured to discipline the second physical hardware clock responsively to a difference between the derived second clock frequency and the third clock frequency.

Further in accordance with an embodiment of the present disclosure the second compute node includes a second physical hardware clock, the clock synchronization circuitry being configured to discipline the second physical hardware clock responsively to a difference between the derived second clock frequency and a transmission rate at which data is transferred from the second compute node to the first compute node via the interconnect data bus.

Still further in accordance with an embodiment of the present disclosure the second compute node includes a second physical hardware clock, the clock synchronization circuitry being configured to discipline the second physical hardware clock of the second compute node responsively to a difference between the data rate at which the data is received from the first compute node by the second compute node, and a transmission rate at which data is transferred from the second compute node to the first compute node via the interconnect data bus.

Additionally in accordance with an embodiment of the present disclosure the data rate is modulated to spread interference across a range of frequencies so that a variation of the data rate overtime describes a modulated signal of frequency against time.

Moreover, in accordance with an embodiment of the present disclosure the clock synchronization circuitry includes filtering circuitry to remove modulation from the modulated signal, the clock synchronization circuitry being configured to derive the second clock frequency from the modulated signal with the modulation removed.

Further in accordance with an embodiment of the present disclosure the clock synchronization circuitry includes filtering circuitry to digitally remove modulation from the modulated signal, the clock synchronization circuitry being configured to derive the second clock frequency from the modulated signal with the modulation removed.

Still further in accordance with an embodiment of the present disclosure the clock synchronization circuitry includes filtering circuitry to transform the modulated signal yielding a Fourier Transform, and identify the second clock frequency from the Fourier Transform.

Additionally in accordance with an embodiment of the present disclosure the clock synchronization circuitry is configured to sample the frequency of the modulated signal yielding multiple frequency values, average the frequency values yielding an average value, and derive the second clock frequency from the average value.

Moreover, in accordance with an embodiment of the present disclosure the clock synchronization circuitry is configured to derive the second clock frequency by fitting parameters of a mathematic model of the modulated signal, the parameters including a frequency based on the first clock frequency.

Further in accordance with an embodiment of the present disclosure the clock synchronization circuitry is configured to fit the parameters based on performing a regression analysis of the mathematical model.

Still further in accordance with an embodiment of the present disclosure the clock synchronization circuitry is configured to fit the parameters responsively to using a machine learning model.

There is also provided in accordance with still another embodiment of the present disclosure a clock syntonization method, including transferring data from a first compute node to a second compute node at a data rate indicative of a first clock frequency of a first physical hardware clock of the first compute node, deriving a second clock frequency from the data rate of the transferred data, and providing a clock signal at the derived second clock frequency in the second compute node.

Additionally in accordance with an embodiment of the present disclosure the data is transferred over an interconnect data bus in at least one digital signal.

Moreover, in accordance with an embodiment of the present disclosure, the method includes disciplining a second physical hardware clock of the second compute node operating at a third clock frequency responsively to a difference between the derived second clock frequency and the third clock frequency.

Further in accordance with an embodiment of the present disclosure, the method includes disciplining a second physical hardware clock of the second compute node responsively to a difference between the derived second clock frequency and a transmission rate at which data is transferred from the second compute node to the first compute node via an interconnect data bus.

Still further in accordance with an embodiment of the present disclosure, the method includes disciplining a second physical hardware clock of the second compute node responsively to a difference between the data rate at which the data is received from the first compute node by the second compute node, and a transmission rate at which data is transferred from the second compute node to the first compute node via an interconnect data bus.

Additionally in accordance with an embodiment of the present disclosure, the method includes modulating the data rate to spread interference across a range of frequencies so that a variation of the data rate over time describes a modulated signal of frequency against time.

Moreover, in accordance with an embodiment of the present disclosure the clock synchronization circuitry includes filtering circuitry to remove modulation from the modulated signal, the clock synchronization circuitry being configured to derive the second clock frequency from the modulated signal with the modulation removed.

Further in accordance with an embodiment of the present disclosure, the method includes digitally removing modulation from the modulated signal and deriving the second clock frequency from the modulated signal with the modulation removed.

Still further in accordance with an embodiment of the present disclosure, the method includes transforming the modulated signal yielding a Fourier Transform, and identifying the second clock frequency from the Fourier Transform.

Additionally in accordance with an embodiment of the present disclosure, the method includes sampling the frequency of the modulated signal yielding multiple frequency values, averaging the frequency values yielding an average value, and deriving the second clock frequency from the average value.

Moreover, in accordance with an embodiment of the present disclosure, the method includes deriving the second clock frequency by fitting parameters of a mathematic model of the modulated signal, the parameters including a frequency based on the first clock frequency.

Further in accordance with an embodiment of the present disclosure, the method includes fitting the parameters based on performing a regression analysis of the mathematical model.

Still further in accordance with an embodiment of the present disclosure, the method includes fitting the parameters responsively to using a machine learning model.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
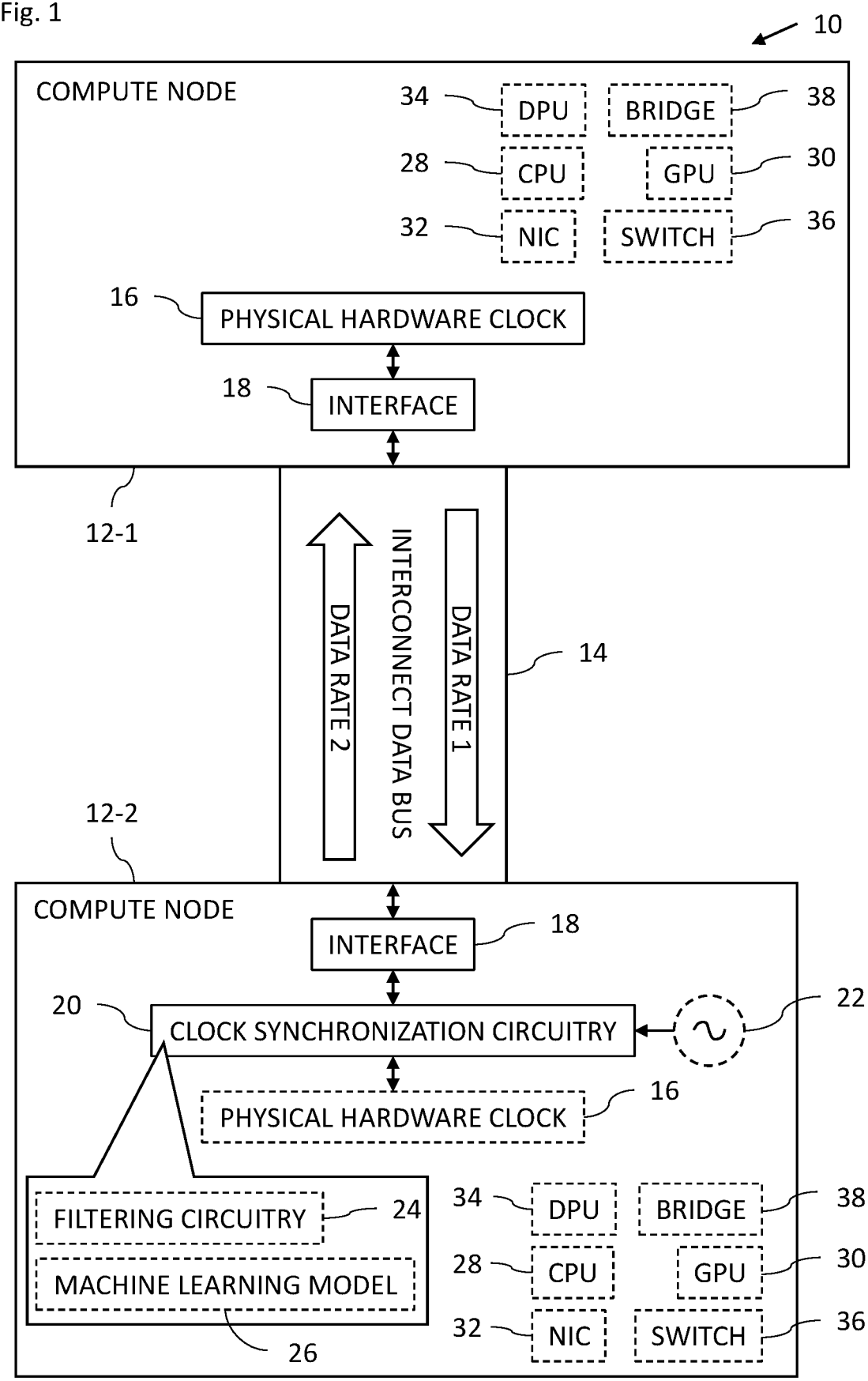
FIG. 1 is a block diagram view of a clock syntonization system constructed and operative in accordance with an embodiment of the present invention.

SyncE and PTP provide clock synchronization between network devices. There is also a need to push timing awareness towards the software stack enabling applications running on different compute nodes to be synchronized. For example, there may be one or more graphics processing unit (GPU) and/or central processing unit (CPU) processes that need to be synchronized. The synchronized timing speeds up utilization and balance of the work between the compute nodes, making connectivity much more efficient with less queues etc.

For many high-speed interconnects (e.g., Peripheral Component Interconnect Express (PCIe) or NVLink), packet-based protocols may provide synchronization between the devices involved (e.g., Precision Time Measurement (PTM) for PCIe). However, these packet-based protocols lack physical-layer-based syntonization and may stall performance. Other solutions such as using semaphore also lack performance.

Embodiments of the present invention address some of the above drawbacks by providing physical-layer-based syntonization between compute nodes (e.g., between two CPUs or GPUs) over an interconnect data bus wherein frequency information is transferred between compute nodes over the interconnect data bus based on the data rate (e.g., symbol rate) of the data transferred in digital signals between the compute nodes. In other words, the data transmission rate from one compute node (first compute node) to another (second compute node) is based on the clock frequency of the transmitting compute node. The receiving compute node then uses the frequency information indicated by the data transmission rate to generate or adjust its clock so that the clock of the receiving compute node is syntonized with the transmitting compute node. The interconnect data bus may include any suitable interconnect data bus such as PCIe, Ethernet, and InfiniBand.

In some embodiments, the second compute node may derive the clock frequency of the first compute node from the data rate of the data being transferred by the interconnect data bus between the first compute node and the second compute node. The derived frequency may then be used by the second compute node to generate a clock signal for use in the second compute node or to correct a clock signal generated by a clock of the second compute node so that the clock signal being used to drive timing in the second compute node is syntonized with the clock frequency of the first compute node.

In some embodiments, the second compute node adjusts its clock signal based on a difference between the derived frequency and the current frequency of the clock of the second compute node. In some embodiments, the second compute node adjusts its clock signal based on a difference between the transmission (TX) data rate from the second compute node to the first compute node and the receive (RX) data rate by the second compute node from the first compute node. In some embodiments, the second compute node adjusts its clock signal based on a difference between: the derived frequency; and the transmission (TX) data rate from the second compute node to the first compute node.

In many highspeed interconnects the frequency of data transmission may be non-constant and changes (e.g., is modulated) over some range. This is done to spread interference across a range of frequencies so that interference with other signals is reduced at any specific frequency. In PCIe, the signals may be reduced up to 0.5% of the base frequency of the clock of the transmitting compute node. Specifications may also specify how the frequency should be modulated (i.e., at what rate). In PCIe it is between 30 and 33 KHz.

The above is known as spread spectrum and modulates the base frequency of the clock used to drive the transmission data rate in a spread spectrum signal. In some embodiments, the base frequency of the clock is derived from the spread spectrum signal. One method to derive the base frequency of the clock is to use a high pass filter or band pass filter so that the spread spectrum modulation is removed to reveal the base frequency of the clock. Another method digitally separates the base frequency of the clock from the modulation signal, for example, using a Fourier Transform (FT). In yet another method, the spread spectrum signal may be sampled at suitably wide intervals to reveal an average signal indicative of the base frequency of the clock. In some embodiments, finite or infinite response filters may be used to transform the spread spectrum signal (e.g., using a FT) to identify the base frequency of the clock.

In some embodiments, a mathematical model of the spread spectrum signal is found, and parameters of the mathematical model are fit using regression analysis or a trained machine learning model to identify the base frequency of the clock which is one of the parameters. The parameters may also include amplitude of spread spectrum signal, modulating frequency of the spread spectrum signal, and phase offset of the function modulating the base frequency (e.g., the 30-33 kHz wave). For example, for a given time T0 of a local clock, T1 is the closest time to T0 when the modulating function reaches some specific value (e.g., the minimum, maximum, or mean of the modulating function) considered to be the beginning of the modulating function's cycle. T0 less T1 is the phase offset of the modulating function. By way of a more explicit, non-limiting example, where the modulating function is a sine function, the equation for the modulating function may be expressed as $F(t)=A \sin(Bt+C)$, where A is amplitude, B is related to frequency, and C is the phase offset.

System Description

Figure 2:
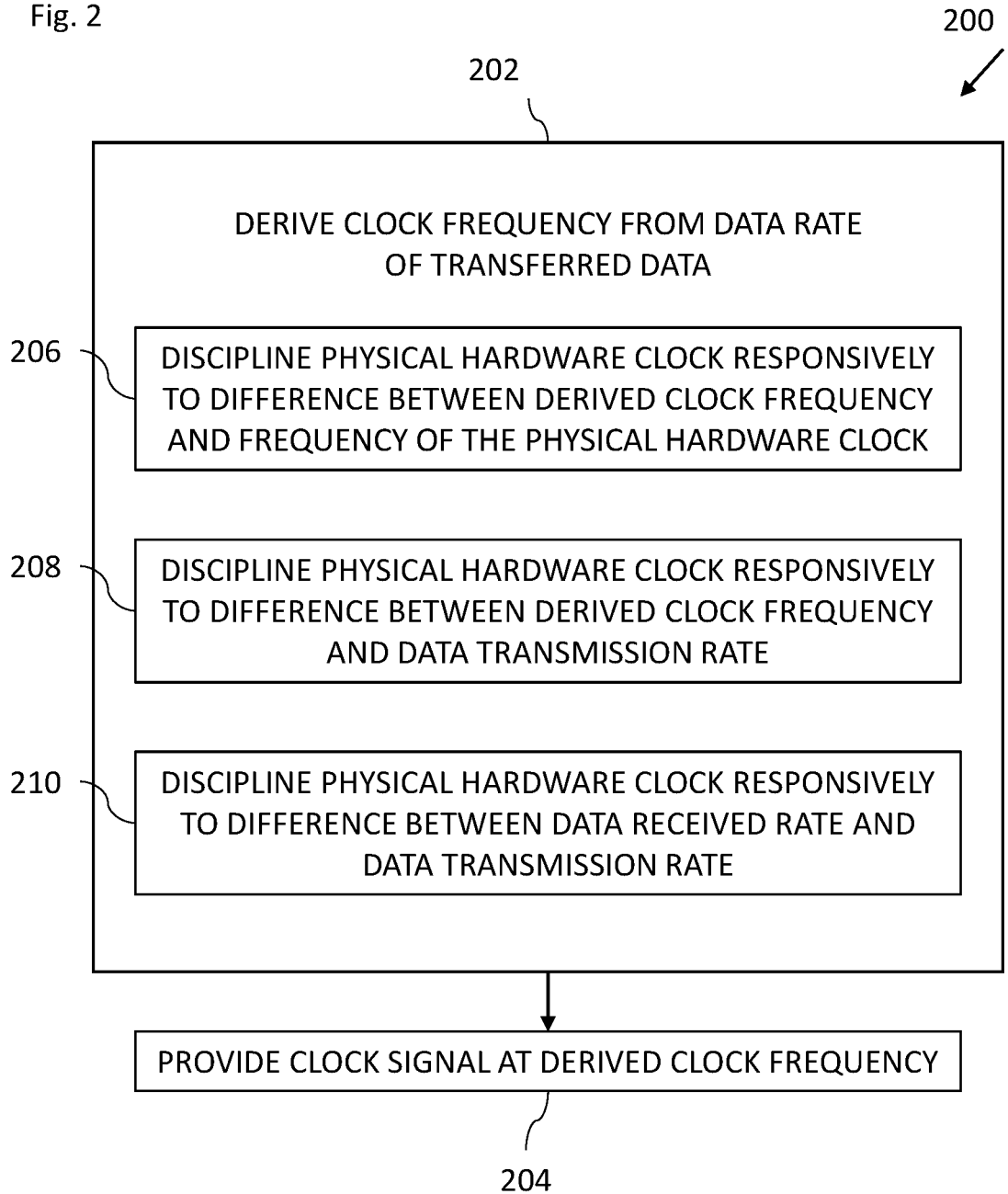
FIG. 2 is a flowchart including steps in a method of operation of the system of FIG. 1.

Reference is now made to FIG. 1, which is a block diagram view of a clock syntonization system 10 constructed and operative in accordance with an embodiment of the present invention. Reference is also made to FIG. 2, which is a flowchart 200 including steps in a method of operation of the system 10 of FIG. 1.

The system 10 includes a plurality of compute nodes 12 (only two shown for the sake of simplicity) connected via one or more interconnect data buses 14 (only one shown for the sake of simplicity). The interconnect data bus 14 may include a peripheral device interconnect data bus. The interconnect data bus 14 may operate according to any suitable protocol, e.g., PCIe, Ethernet, or InfiniBand.

The system 10 is configured to synchronize all the compute nodes 12 in the system 10 to the clock frequency of one of the compute nodes 12 designated as a synchronization leader. The synchronization leader uses its frequency source to drive a transmission symbol rate on the interconnect data buses 14 from one compute node 12 to the other. The compute nodes 12 not designated as the synchronization leader are designated as synchronization followers. Each synchronization follower may use the symbol rate of data received on the interconnect data bus 14 to synchronize its clock to the clock rate indicated by the symbol rate of the received data or use the symbol rate to directly drive a clock signal, described in more detail below.

Each compute node 12 may include a physical hardware clock 16 and an interface 18. The physical hardware clock 16 is configured to maintain a clock frequency and/or clock time. The interface 18 is configured to transfer data with one or more of the compute nodes 12 over the interconnect data bus 14. Each compute node 12 may include clock synchronization circuitry 20 configured to synchronize the compute node 12 (in which the clock synchronization circuitry 20 is disposed) to the clock frequency of another compute node 12. Each compute 12 may include an oscillator 22 to provide a clock signal for use when no external clock input is provided. The clock synchronization circuitry 20 may include filtering circuitry 24 and/or a machine learning model 26, described in more detail below with reference to FIGS. 3 and 6. Each compute node 12 may include computing circuitry which may include one or more of the following: a CPU 28; a GPU 30; a network interface controller (NIC) 32; a data processing unit (DPU) 34, which may include a NIC and other processors such as multiple core processors; a switch 36; and/or a bridge 38.

In FIG. 1, the physical hardware clock 16 of compute node 12-1 is configured to operate at a first clock frequency. In FIG. 1, the interconnect data bus 14 is configured to transfer data from compute node 12-1 at a first data rate (e.g., data rate 1) indicative of the first clock frequency of the physical hardware clock 16 of compute node 12-1.

The clock synchronization circuitry 20 of compute node 12-2 is configured to: derive a second clock frequency from the data rate of the transferred data (e.g., data rate 1) from compute node 12-1 (block 202); and provide a clock signal at the derived second clock frequency (block 204). In some embodiments, the clock signal provided in compute node 12-2 may be generated directly from the data rate of the transmitted data (e.g., data rate 1) and used in the compute node 12-2 for timing issues such as generating timestamps, timing execution of software, and setting a second data rate (e.g., data rate 2) at which data is transmitted by the interconnect data bus 14 from compute node 12-2 to compute node 12-1.

In some embodiments, the interconnect data bus 14 is configured to transmit data in a digital signal from compute node 12-2 to compute node 12-1 (or another one of the compute nodes 12) at the second data rate (e.g., data rate 2), which may be based on the clock frequency of the physical hardware clock 16 of compute node 12-2 (and operate at a third clock frequency), which may be driven by the oscillator 22 of compute node 12-2. The clock synchronization circuitry 20 of compute node 12-2 is configured to: derive the second clock frequency from the data rate of the transferred data (e.g., data rate 1) from compute node 12-1 (block 202); and provide the clock signal at the derived second clock frequency (block 204) by adjusting a clock signal provided by the physical hardware clock 16 of compute node 12-2 to the second clock frequency. In other words, if the physical hardware clock 16 of compute node 12-1 is running faster than the physical hardware clock 16 of compute node 12-2 as evidenced by the difference between the second and third clock frequency, or between data rate 1 and data rate 2, or between the second clock frequency and data rate 2, or between data rate 1 and the third clock frequency, then the clock synchronization circuitry 20 instructs the physical hardware clock 16 to speed up, and vice-versa. The adjustment of the physical hardware clock 16 of compute node 12-2 may be affected using a feedback loop which iteratively adjusts the clock frequency of the physical hardware clock 16 of compute node 12-2.

In some embodiments, the clock synchronization circuitry 20 of the compute node 12-2 is configured to discipline the physical hardware clock 16 of the compute node 12-2 responsively to a difference between the derived second clock frequency and the third clock frequency (block 206).

In some embodiments, the clock synchronization circuitry 20 of the compute node 12-2 is configured to discipline the physical hardware clock 16 of the compute node 12-2 responsively to a difference between the derived second clock frequency and a transmission rate (e.g., data rate 2) at which data is transferred from the compute node 12-2 to the compute node 12-1 via the interconnect data bus 14 (block 208).

In some embodiments, the clock synchronization circuitry 20 of the compute node 12-2 is configured to discipline the physical hardware clock 16 of the compute node 12-2 responsively to a difference between: the data rate (e.g., data rate 1) at which the data is received from the compute node 12-1 by the compute node 12-2; and a transmission rate (e.g., data rate 2) at which data is transferred from the compute node 12-2 to the compute node 12-1 via the interconnect data bus 14 (block 210).

The clock synchronization circuitry 20 may include any suitable frequency synthesizer such as a frequency jitter synchronizer and/or jitter network synchronizer clock. An example of a suitable frequency synthesizer 14 is Ultra-Low Jitter Network Synchronizer Clock LMK05318 commercially available from Texas Instruments Inc., 12500 TI Boulevard Dallas, Texas 75243 USA. The frequency synthesizer may receive a control signal (to adjust the clock frequency up or down) or a clock signal as input (e.g., when the compute node 12-2 does not include a physical hardware clock but uses the clock signal recovered from the data rate of data received over interconnect data bus 14) and output a clock signal responsively to the input control signal or clock signal. When no control signal or clock signal is input, the frequency synthesizer may generate a clock signal based on the output of the oscillator 22. In some embodiments, the frequency synthesizer may be replaced with a signal selector or switch which selectively uses the output of the oscillator 22 or the frequency of the received data (RX) signal as input.

In some embodiments, the synchronization leader may measure the difference between its own symbol transmission rate and the rate of symbols it receives from one or more of the synchronization followers (or perform a clock recovery of the received data stream and compare the recovered clock to the clock of the synchronization leader) to assess the syntonization accuracy of the follower(s) and take appropriate action, such as raise an alarm, log an event, and/or report a status to software.

In practice, some or all of the functions of the clock synchronization circuitry 20 may be combined in a single physical component or, alternatively, implemented using multiple physical components. These physical components may comprise hard-wired or programmable devices, or a combination of the two. In some embodiments, at least some of the functions of the clock synchronization circuitry 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
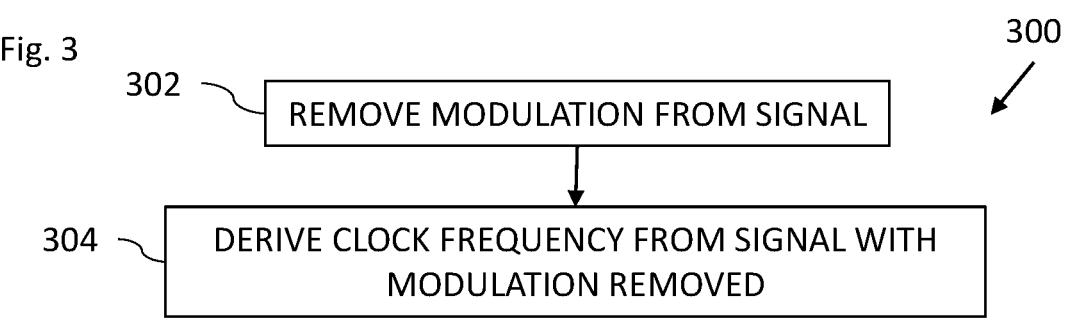
FIG. 3 is a flowchart including steps in a first method to derive a clock frequency from a spread-spectrum signal.

Reference is now made to FIG. 3, which is a flowchart 300 including steps in a first method to derive a clock frequency from a spread-spectrum signal. Many modern systems employ a feature called "spread spectrum clocking". Spread spectrum clocking (SSC) aims to dissipate emitted electromagnetic noise over a range of frequencies, thus reducing the interference on any one frequency, an effect known as spectral amplitude reduction. SSC is implemented by modulating the "reference" or "base" high-frequency signal with a lower-frequency wave. Typically, the characteristics of the modulated signal (or at least their permitted values) are governed by specifications. For example, in case of PCIe, the frequency of the modulating signal has to be between 30 and 33 kHz and the clock frequency can be down-spread by (depending on the system) −0.5/−0.3% of the reference frequency. The specifications of the different high-speed interconnects may or may not dictate the form/shape of the modulating SSC wave. In some examples, the modulating wave was a triangular wave.

In some embodiments, the data rate (of data transfer from the compute node 12-1 to compute node 12-2) is modulated to spread interference across a range of frequencies so that a variation of the data rate over time describes a modulated signal of frequency against time. The filtering circuitry 24 of clock synchronization circuitry 20 is configured to remove modulation from the modulated signal (block 302). The clock synchronization circuitry 20 is configured to derive the second clock frequency from the modulated signal with the modulation removed (block 304).

In some embodiments, the filtering circuitry 24 may include a high-pass or band-pass filter which is configured to remove the modulation from the modulated signal. In other embodiments, the filtering circuitry 24 is configured to digitally remove modulation from the modulated signal, and the clock synchronization circuitry 20 is configured to derive the second clock frequency from the modulated signal with the modulation removed. For example, a Fourier Transform (FT) of the modulated signal is performed, the modulation frequency is removed from the FT, an inverse FT is then performed of the FT with the modulation frequency removed, and then the second clock frequency is found from the inverse FT.

Figure 4:
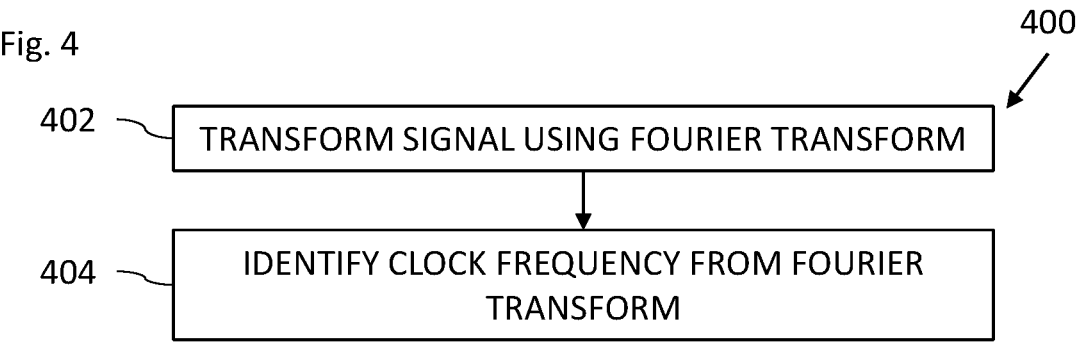
FIG. 4 is a flowchart including steps in a second method to derive a clock frequency from a spread-spectrum signal.

Reference is now made to FIG. 4, which is a flowchart 400 including steps in a second method to derive a clock frequency from a spread-spectrum signal. The filtering circuitry 24 is configured to transform the modulated signal yielding a Fourier Transform (block 402); and identify the second clock frequency from the Fourier Transform (block 404), e.g., by finding the peak in the FT which is not the modulation frequency.

Figure 5:
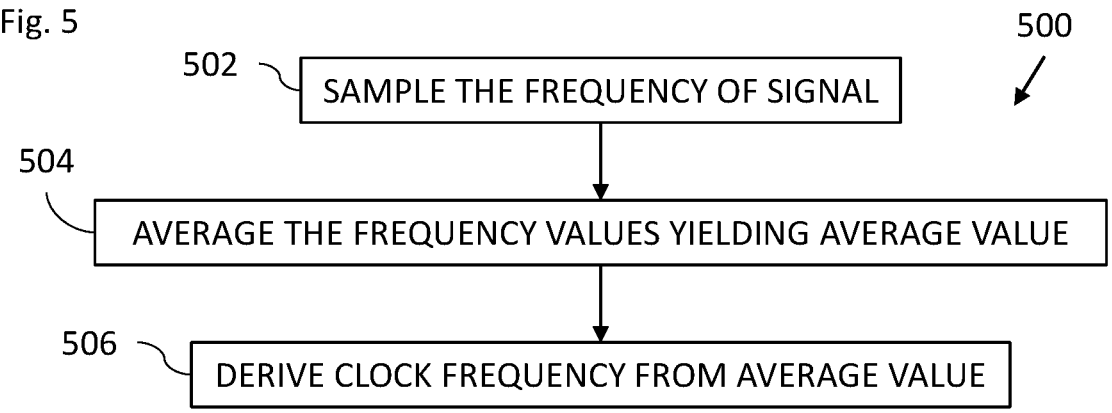
FIG. 5 is a flowchart including steps in a third method to derive a clock frequency from a spread-spectrum signal.

Reference is now made to FIG. 5, which is a flowchart 500 including steps in a third method to derive a clock frequency from a spread-spectrum signal. The clock synchronization circuitry 20 is configured to: sample the frequency of the modulated signal (yielding multiple frequency values), e.g., spaced at wide enough intervals to achieve an average sampling (block 502); average the frequency values yielding an average value (block 504); and derive the second clock frequency from the average value (block 506).

Figure 6:
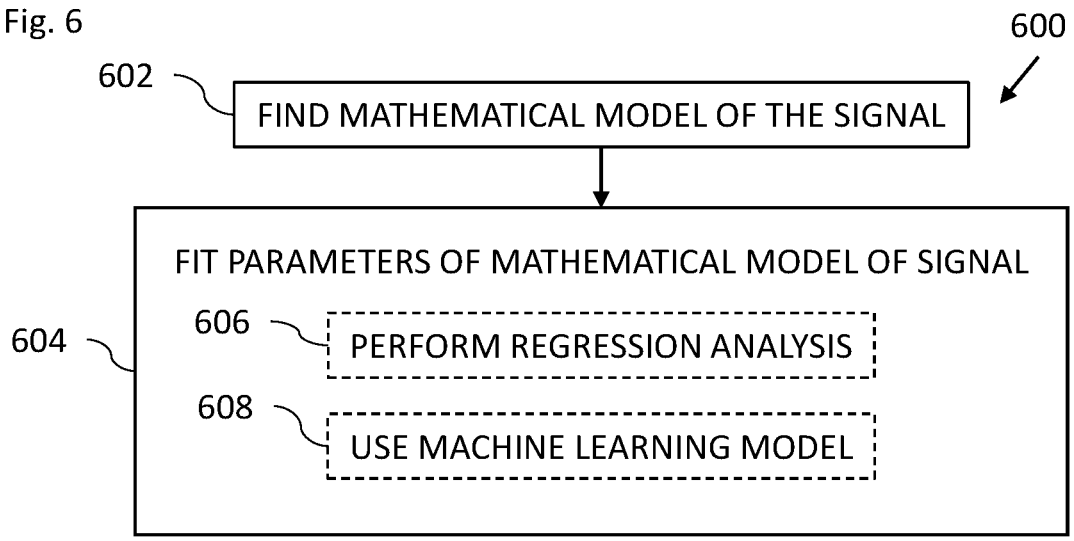
FIG. 6 is a flowchart including steps in a fourth method to derive a clock frequency from a spread-spectrum signal.

Reference is now made to FIG. 6, which is a flowchart 600 including steps in a fourth method to derive a clock frequency from a spread-spectrum signal. The method includes finding a mathematical model of the modulated signal (block 602). The model includes parameters such as the base frequency (based on the first clock frequency), amplitude of spread spectrum signal, modulating frequency of the spread spectrum signal, and phase offset. The clock synchronization circuitry 20 is configured to derive the second clock frequency by fitting the parameters of the mathematic model of the modulated signal (block 604).

In some embodiments, clock synchronization circuitry 20 is configured to fit the parameters based on performing a regression analysis of the mathematical model (block 606). In other embodiments, the clock synchronization circuitry 20 is configured to fit the parameters responsively to using a machine learning model (block 608). The machine learning module may be generated, for example, by training a decision tree or neural network with inputs equal to the modulated signal and outputs equal to the parameters. The trained decision tree or neural network is used with modulated signal as input to yield an output comprising the parameters which include the base frequency.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A clock syntonization system, comprising:
a first compute node comprising a first physical hardware clock to operate at a first clock frequency;
a second compute node; and
an interconnect data bus to transfer data from the first compute node at a data rate indicative of the first clock frequency of the first physical hardware clock, and wherein the second compute node includes clock synchronization circuitry to:
derive a second clock frequency from the data rate of the transferred data; and
provide a clock signal at the derived second clock frequency.

2. The system according to claim 1, wherein the first compute and second compute node may include any one or more of the following: a central processing unit; a graphics processing unit; a network interface controller; a switch; a bridge; and a data processing unit.

3. The system according to claim 1, wherein the interconnect data bus is a peripheral device interconnect data bus.

4. The system according to claim 1, wherein the data is transferred over the interconnect data bus in at least one digital signal.

5. The system according to claim 1, wherein the second compute node includes a second physical hardware clock to operate at a third clock frequency, the clock synchronization circuitry being configured to discipline the second physical hardware clock responsively to a difference between the derived second clock frequency and the third clock frequency.

6. The system according to claim 1, wherein the second compute node includes a second physical hardware clock, the clock synchronization circuitry being configured to discipline the second physical hardware clock responsively to a difference between the derived second clock frequency and a transmission rate at which data is transferred from the second compute node to the first compute node via the interconnect data bus.

7. The system according to claim 1, wherein the second compute node includes a second physical hardware clock, the clock synchronization circuitry being configured to discipline the second physical hardware clock of the second compute node responsively to a difference between: the data rate at which the data is received from the first compute node by the second compute node; and a transmission rate at which data is transferred from the second compute node to the first compute node via the interconnect data bus.

8. The system according to claim 1, wherein the data rate is modulated to spread interference across a range of frequencies so that a variation of the data rate over time describes a modulated signal of frequency against time.

9. The system according to claim 8, wherein the clock synchronization circuitry includes filtering circuitry to remove modulation from the modulated signal, the clock synchronization circuitry being configured to derive the second clock frequency from the modulated signal with the modulation removed.

10. The system according to claim 8, wherein the clock synchronization circuitry includes filtering circuitry to digitally remove modulation from the modulated signal, the clock synchronization circuitry being configured to derive the second clock frequency from the modulated signal with the modulation removed.

11. The system according to claim 8, wherein the clock synchronization circuitry includes filtering circuitry to:
transform the modulated signal yielding a Fourier Transform, and
identify the second clock frequency from the Fourier Transform.

12. The system according to claim 8, wherein the clock synchronization circuitry is configured to: sample the frequency of the modulated signal yielding multiple frequency values; average the frequency values yielding an average value; and derive the second clock frequency from the average value.

13. The system according to claim 8, wherein the clock synchronization circuitry is configured to derive the second clock frequency by fitting parameters of a mathematic model of the modulated signal, the parameters including a frequency based on the first clock frequency.

14. The system according to claim 13, wherein the clock synchronization circuitry is configured to fit the parameters based on performing a regression analysis of the mathematical model.

15. The system according to claim 13, wherein the clock synchronization circuitry is configured to fit the parameters responsively to using a machine learning model.

16. A clock syntonization method, comprising:
transferring data from a first compute node to a second compute node at a data rate indicative of a first clock frequency of a first physical hardware clock of the first compute node;
deriving a second clock frequency from the data rate of the transferred data; and
providing a clock signal at the derived second clock frequency in the second compute node.

17. The method according to claim 16, wherein the data is transferred over an interconnect data bus in at least one digital signal.

18. The method according to claim 16, further comprising disciplining a second physical hardware clock of the second compute node operating at a third clock frequency responsively to a difference between the derived second clock frequency and the third clock frequency.

19. The method according to claim 16, further comprising disciplining a second physical hardware clock of the second compute node responsively to a difference between the derived second clock frequency and a transmission rate at which data is transferred from the second compute node to the first compute node via an interconnect data bus.

20. The method according to claim 16, further comprising disciplining a second physical hardware clock of the second compute node responsively to a difference between: the data rate at which the data is received from the first compute node by the second compute node; and a transmission rate at which data is transferred from the second compute node to the first compute node via an interconnect data bus.

21. The method according to claim 16, further comprising modulating the data rate to spread interference across a range of frequencies so that a variation of the data rate over time describes a modulated signal of frequency against time.

22. The method according to claim 21, wherein the clock synchronization circuitry includes filtering circuitry to remove modulation from the modulated signal, the clock synchronization circuitry being configured to derive the second clock frequency from the modulated signal with the modulation removed.

23. The method according to claim 21, further comprising digitally removing modulation from the modulated signal and deriving the second clock frequency from the modulated signal with the modulation removed.

24. The method according to claim 21, further comprising:
transforming the modulated signal yielding a Fourier Transform; and
identifying the second clock frequency from the Fourier Transform.

25. The method according to claim 21, further comprising:
sampling the frequency of the modulated signal yielding multiple frequency values;
averaging the frequency values yielding an average value; and
deriving the second clock frequency from the average value.

26. The method according to claim 21, further comprising deriving the second clock frequency by fitting parameters of a mathematic model of the modulated signal, the parameters including a frequency based on the first clock frequency.

27. The method according to claim 26, further comprising fitting the parameters based on performing a regression analysis of the mathematical model.

28. The method according to claim 26, further comprising fitting the parameters responsively to using a machine learning model.

* * * * *